Sept. 18, 1934.　　　　G. B. GILBERT　　　　1,974,213
SERVICE TRAY
Filed June 17, 1932
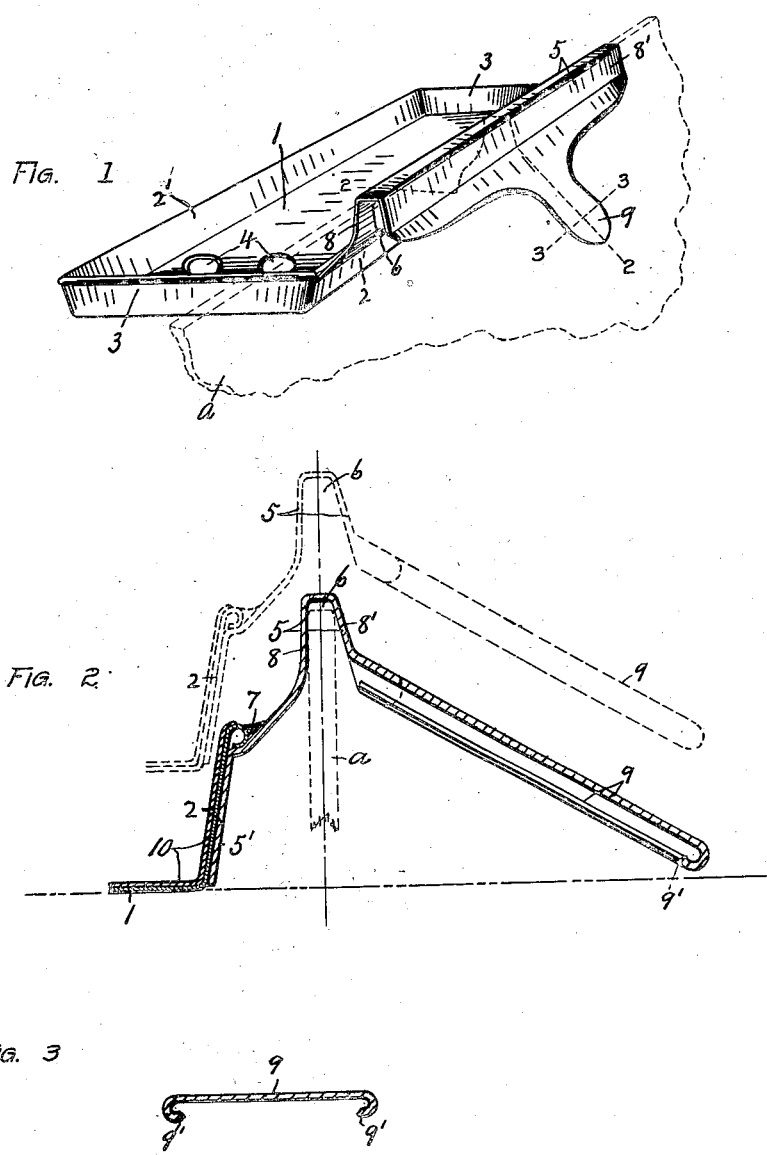
INVENTOR
G. B. Gilbert
BY
Denison & Thompson
ATTORNEYS

UNITED STATES PATENT OFFICE 1,974,213

SERVICE TRAY

Gordon B. Gilbert, Syracuse, N. Y.

Application June 17, 1932, Serial No. 617,735

1 Claim. (Cl. 45—51)

This invention relates to a serving tray adapted to be used more particularly by roadside caterers for supplying lunches to automobilists, the tray being provided with means whereby it may be placed over and upon and supported by the upper edge of an automobile window glass so that the latter with the tray thereon may be raised and lowered to bring the tray with the food thereon to the most convenient height for self-service or practically closed in case of storm without removing the tray.

The main object, therefore, of the invention is to provide a service tray of this character capable of being easily carried from place to place with the dishes or food thereon and conveniently placed over and upon the upper edge of an automobile window glass with the major portion of the tray on the inside ready for self-service by the occupants of the automobile.

Another object is to provide the bottom of the tray with two or more openings for the reception of ice cream cones or other receptacles.

A further object is to provide one side of the tray with a downwardly and outwardly inclined handle disposed at such an angle to the bottom of the tray that the latter may be supported in a horizontal position by the natural position of the hand on the handle.

Another object is to provide the tray with a paper or other comparatively inexpensive non-metallic removable lining.

A further object is to provide the upper edge of one side of the tray with an outwardly projecting flange having a groove in the underside thereof of about the same width as the thickness of the window glass so that when the tray is placed over and upon the window glass the walls of the groove will wedge tightly against the upper edge of the glass to firmly hold the tray in a horizontal position.

A further object is to construct the tray in such manner that a plurality of them may be stacked telescopically one upon another in a relatively compact space.

Other objects and uses relating to specific parts of the tray will be brought out in the following description.

In the drawing:—

Figure 1 is a perspective view of a service tray embodying the various features of my invention, the dotted lines indicating the upper portion of a window glass of an automobile.

Figure 2 is an enlarged transverse vertical sectional view taken on line 2—2, Figure 1 as operatively mounted upon the upper edge of a window glass as shown by dotted lines, a portion of a similar service tray being also shown by dotted lines in position to be stacked upon the first tray.

Figure 3 is an enlarged detail sectional view through the handle to show the construction of the same.

The tray, as shown, is preferably made of sheet metal and substantially rectangular in top plan and comprises a bottom portion 1, opposite sides 2 and 2', and opposite ends 3, the side and end walls being preferably inclined upwardly and outwardly to enable the trays to be stacked telescopically one within the other when not in use.

The bottom 1 of the tray may be provided near one end with one or more openings 4 for receiving ice cream cones or other receptacles to hold the latter against lateral or lengthwise movement along the bottom of the tray when placed thereon.

One of the lengthwise sides as 2 of the tray is provided with an inverted U-shaped extension 5 projecting upwardly and outwardly from the upper edge thereof to form a lengthwise groove 6 in its underside for receiving the upper edge of the conventional automobile window glass as $a$ which is adapted to be raised and lowered in any well-known manner. That is, the upper edge of one side of the tray is extended upwardly, outwardly and downwardly to form the groove 6, the inner and outer walls of said groove being flat throughout their areas and downwardly divergent to wedge against the inner and outer faces of the glass.

The extension 5 is preferably made separately from the main body of the tray for convenience and economy of manufacture and is provided with a pendant integral plate 5' adapted to be spot-welded or otherwise permanently secured to the adjacent side wall of the tray to reinforce the same, but obviously the extension 5 may be made integral with the adjacent side of the tray without departing from the spirit of the invention.

When the extension 5 is made separately from the tray, as just described, a suitable filler 7 of solder or other equivalent material may be permanently applied to the upper edge of the tray and adjacent portion of the extension to cover the joint smoothly and thereby to prevent the lodgment of foreign matter in said joint so that the entire inner and outer surfaces of the tray may be easily and quickly cleansed and kept in a sanitary condition.

The extension 5 extends upwardly and outwardly some distance above and beyond the adjacent side 2 of the main body of the tray and is preferably made of sheet metal, the upper portion of the flange being made in the form of an inverted U in cross section to form the groove 6.

The inner wall as 8 of the groove 6 is flat and disposed in a plane slightly inclined upwardly and inwardly but at approximately right angles to the bottom one, as shown in Figure 2, while the outer wall 8' of the same groove is also flat and inclined downwardly and outwardly at a greater angle from a vertical than that of the inner wall 8 to enable both walls to fit different thicknesses of glass and to wedge tightly thereon thereby causing the inner wall to lie flatwise against the glass for holding the bottom of the tray in a substantially horizontal position when the tray is supported on the glass.

The groove 6 is, therefore, tapered slightly from bottom to top, the upper portion being of approximately the same width as the upper edge of the glass $a$ which it is adapted to engage so that when the grooved extension 5 is placed over and upon the upper edge of the glass, its opposite walls will wedge tightly against opposite faces of the glass to firmly hold the tray against rocking movement or rather to hold the bottom of the tray in a substantially horizontal position.

The lower edge of the outer wall 8' of the groove 6 is provided with an outwardly and downwardly inclined handle 9 integral therewith and preferably midway between the ends of the tray, the handle being disposed in this instance at an angle of approximately 30 degrees from a horizontal which is found to be most convenient for carrying the tray in a horizontal position with the hand in a natural position.

The outer end of the handle 9 is disposed in approximately the horizontal plane of the bottom 1 of the tray to facilitate the stacking of the trays telescopically one upon the other and at the same time affording ample length of the handle to be grasped in the hand.

As previously stated, the flange 5 and its integral handle 9 are made of sheet metal and in order that the handle may conveniently be held in the hand its opposite longitudinal edges are returned inwardly at 9' for reinforcing purposes and also to avoid cutting of the hand when carrying the tray from place to place or placing it over and upon the upper edge of the window glass $a$.

The tray constructed in the manner described is particularly simple and may be manufactured and sold at a comparatively low cost so that the caterers at the roadside may carry large numbers of them in stock for simultaneous service to different patrons with the assurance that when not in use they may be stored telescopically one within the other in compact space.

When it is desired to use the tray by any caterer along the roadside, the articles ordered may be placed thereon and then the tray with the articles thereon is conveyed by means of the handle 9 to the automobile of the patron and the grooved extension 5 placed over and upon the upper edge of the window glass $a$ from the outside of the car with the tray and articles thereon on the inside in which position the tray will be automatically held in place by the window glass and the patrons may readily serve themselves from the tray as needed.

When the patrons are served in this manner, the caterer may grasp the handle 9 from the outside, lift the tray with the emptied dishes thereon from the upper edge of the window glass and reconvey the same to the service stand, thus avoiding any inconvenience to the patron.

It is evident, however, that various changes may be made in the detail construction without departing from the spirit of the invention.

For sanitary purposes, a supplemental tray 10 of paper or other comparatively inexpensive nonmetallic material may be removably applied to the inner surfaces of the bottom and sides of the main tray, as shown more clearly in Figure 2 and constructed in such manner that the upper marginal edges of the sides and ends may slightly overlap upon the corresponding sides and ends of the metal tray, this supplemental tray being adapted to be removed and destroyed after each service to prevent reuse by other patrons.

What I claim is:

In combination with a serving tray adapted to be supported upon and movable with the upper edge of a vertically adjustable automobile window glass, an upwardly extending U-shaped support secured to one side of said tray having the portion adjacent said tray inclined at an angle to the plane of the tray, a plane portion perpendicular to the plane of the tray adapted to frictionally engage the inner face of said glass, and a downwardly extending plane portion slightly diverging from the first named plane portion and adapted to frictionally engage the outer face of the glass.

GORDON B. GILBERT.